(12) United States Patent
Young et al.

(10) Patent No.: US 7,397,810 B1
(45) Date of Patent: Jul. 8, 2008

(54) ARTERY NODES

(75) Inventors: C. David Young, Plano, TX (US); James A. Stevens, Allen, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 753 days.

(21) Appl. No.: 10/867,481

(22) Filed: Jun. 14, 2004

(51) Int. Cl.
  *H04L 12/28* (2006.01)
(52) U.S. Cl. ....................................... 370/431
(58) Field of Classification Search ................. 370/431, 370/442, 443, 447, 458, 461, 468, 250
  See application file for complete search history.

(56) References Cited

U.S. PATENT DOCUMENTS

| | | | |
|---|---|---|---|
| 4,504,946 A | 3/1985 | Raychaudhuri | 370/322 |
| 4,763,322 A | 8/1988 | Eizenhofer | 370/337 |
| 5,012,469 A | 4/1991 | Sardana | 370/322 |
| 5,117,422 A | 5/1992 | Hauptschein et al. | 370/255 |
| 5,245,609 A | 9/1993 | Ofek et al. | 370/348 |
| 5,295,140 A | 3/1994 | Crisler et al. | 370/443 |
| 5,396,496 A | 3/1995 | Ito et al. | 370/314 |
| 5,420,858 A | 5/1995 | Marshall et al. | 370/352 |
| 5,448,698 A | 9/1995 | Wilkes | 395/200.01 |
| 5,450,394 A | 9/1995 | Gruber et al. | 370/17 |
| 5,457,681 A | 10/1995 | Gaddis et al. | 370/402 |
| 5,502,722 A | 3/1996 | Fulghum | 370/69 |
| 5,506,848 A | 4/1996 | Drakopoulos et al. | 370/336 |
| 5,568,477 A | 10/1996 | Galand et al. | 370/60 |
| 5,581,548 A | 12/1996 | Ugland et al. | 370/330 |
| 5,594,720 A | 1/1997 | Papadopoulos et al. | 370/330 |
| 5,598,417 A | 1/1997 | Crisler et al. | 370/348 |
| 5,613,198 A | 3/1997 | Ahmadi et al. | 370/337 |
| 5,625,629 A | 4/1997 | Wenk | 370/330 |
| 5,644,576 A | 7/1997 | Bauchot et al. | 370/437 |
| 5,652,751 A | 7/1997 | Sharony | 340/2.4 |
| 5,696,903 A | 12/1997 | Mahany | 709/228 |
| 5,719,868 A | 2/1998 | Young | 370/436 |
| 5,742,593 A * | 4/1998 | Sharony et al. | 370/330 |
| 5,748,362 A | 5/1998 | Delacourt et al. | 359/326 |
| 5,920,703 A | 7/1999 | Campbell et al. | 709/236 |
| 5,949,760 A | 9/1999 | Stevens et al. | 370/280 |
| 5,953,344 A | 9/1999 | Dail et al. | 370/337 |
| 5,983,259 A | 11/1999 | Campbell et al. | 709/200 |

(Continued)

OTHER PUBLICATIONS

L. Pond and V. Li, "Bridging the Gap Interoperability, Survivability, Security," 1989 IEEE MILCOM, Conference Record, vol. 1 of 3.

(Continued)

*Primary Examiner*—Seema S. Rao
*Assistant Examiner*—Mon Cheri S Davenport
(74) *Attorney, Agent, or Firm*—Nathan O. Jensen; Kyle Eppele

(57) ABSTRACT

A method of communicating over a network of nodes is disclosed. According to the method, it is determined whether a first node forms part of an interconnected sub-network within the network. Broadcast slots are assigned to the first node if the first node is part of the sub-network. The first node is permitted to use the assigned broadcast slots to broadcast data to other nodes. Nodes within one hop of the first node but not forming part of the sub-network are permitted to use an assigned broadcast slot if the first node is not using the broadcast slot.

17 Claims, 11 Drawing Sheets

U.S. PATENT DOCUMENTS

| | | | |
|---|---|---|---|
| 6,014,089 A | 1/2000 | Tracy et al. | 340/870.02 |
| 6,018,528 A | 1/2000 | Gitlin et al. | 370/436 |
| 6,031,827 A | 2/2000 | Rikkinen et al. | 370/330 |
| 6,084,888 A | 7/2000 | Watanabe et al. | 370/473 |
| 6,084,889 A | 7/2000 | Murakami | 370/474 |
| 6,088,659 A | 7/2000 | Kelley et al. | 702/62 |
| 6,094,425 A | 7/2000 | Auger et al. | 370/330 |
| 6,094,429 A | 7/2000 | Blanchette et al. | 370/337 |
| 6,151,319 A | 11/2000 | Dommety et al. | 370/395.52 |
| 6,157,656 A | 12/2000 | Lindgren et al. | 370/458 |
| 6,252,868 B1 | 6/2001 | Diachina et al. | 370/347 |
| 6,256,304 B1 | 7/2001 | Vayrynen | 370/350 |
| 6,256,477 B1 | 7/2001 | Eidson et al. | 455/63.3 |
| 6,275,506 B1 | 8/2001 | Fazel et al. | 370/459 |
| 6,304,559 B1 | 10/2001 | Jacklin et al. | 370/310 |
| 6,310,867 B1 | 10/2001 | Tat et al. | 370/254 |
| 6,314,084 B1 | 11/2001 | Kahale et al. | 370/230 |
| 6,317,436 B1 * | 11/2001 | Young et al. | 370/443 |
| 6,324,184 B1 | 11/2001 | Hou et al. | 340/7.43 |
| 6,331,973 B1 | 12/2001 | Young et al. | 370/337 |
| 6,353,598 B1 | 3/2002 | Baden et al. | 370/280 |
| 6,353,605 B1 | 3/2002 | Rautanen et al. | 370/337 |
| 6,369,719 B1 | 4/2002 | Tracy et al. | 340/870.02 |
| 6,384,739 B1 | 5/2002 | Roberts, Jr. et al. | 340/905 |
| 6,389,273 B1 | 5/2002 | Brandenburg | 455/296 |
| 6,414,955 B1 * | 7/2002 | Clare et al. | 370/390 |
| 6,442,157 B1 | 8/2002 | Carter et al. | 370/347 |
| 6,466,793 B1 | 10/2002 | Wallstedt et al. | 455/450 |
| 6,469,996 B1 | 10/2002 | Dupuy | 370/337 |
| 6,487,186 B1 | 11/2002 | Young et al. | 370/336 |
| 6,498,667 B1 | 12/2002 | Masucci et al. | 398/98 |
| 6,504,829 B1 | 1/2003 | Young et al. | 370/337 |
| 6,529,443 B2 | 3/2003 | Downey et al. | 367/76 |
| 6,553,424 B1 | 4/2003 | Kranz et al. | 709/234 |
| 6,556,899 B1 | 4/2003 | Harvey et al. | 701/29 |
| 6,574,206 B2 | 6/2003 | Young | 370/337 |
| 6,600,754 B1 | 7/2003 | Young et al. | 370/459 |
| 6,628,636 B1 | 9/2003 | Young | 370/337 |
| 6,631,124 B1 | 10/2003 | Koorapaty et al. | 370/337 |
| 6,711,177 B1 | 3/2004 | Young et al. | 370/468 |
| 2002/0001294 A1 | 1/2002 | Amouris | 370/337 |
| 2002/0046381 A1 | 4/2002 | Morris et al. | 714/752 |

OTHER PUBLICATIONS

Bittle, Caples, Young, "Soldier Phone: An Innovative Approach to Wireless Multimedia Communications," 1998 IEEE MILCOM, vol. 3.

Sunlin, "A Hybrid Distributed Slot Assignment TDMA Channel Access Protocol," IEEE Military Communications Conference, 1990, vol. 3 of 3.

Young and Stevens, "Clique Activation Multiple Access (CAMA): A Distributed Heuristic for Building Wireless Datagram Networks," IEEE Military Communications Conference 1998, vol. 1 I. Chlamtac and A. Farago, "An Optimal Channel Access Protocol with Multiple Reception Capacity," Dept. of Telecommunications & Telematics, Technical University of Budapest, Budapest, Hungary. Publication date unknown; believed to be 1993.

Ju et al. "An Optimal Topology-Transport Scheduling Method in Multihop Packet Radio Networks." IEEE/ACM Transactions on Networking. Jun. 1998. pp. 298-306.

Chakraborty et al. "Generic Algorithm for Broadcast Scheduling in Packet Radio Networks," Evolutionary Computation Proceedings, 1998. IEEE World Congress on Computational Intelligence. May 4-9, 1998. pp. 183-188.

Pond et al. "A Distributed Time-Slot Assignment Protocol for Mobile Multi-Hop Broadcast Packet Radio Networks," IEEE MILCOM, 1989. Oct. 15-18, 1989. pp. 70-74.

Arikan, E. "Some Complexity Results about Packet Radio Networks," IEEE Transactions on Information Theory, v.IT-30, No. 4, Jul. 1984, pp. 681-685.

Chou et al. "Slot Allocation Strategies for TDMA Protocols in Multihop Packet Radio Network." Eleventh Annual Joint Conference of the IEEE Computer and Communications Societies, May 4-8, 1992. pp. 710-716.

Oono et al. "Dynamic Slot Allocation Technology for Mobile Multi-Media TDMA Systems Using Distributed Control Scheme," IEEE. Oct. 12-16, 1997. pp. 74-78.

Young, "USAP: A Unifying Dynamic Distributed Multichannel TDMA Slot Assignment Protocol," Proc. IEE MILCOM 1996, vol. 1, Oct. 1996.

U.S. Appl. No. 09/562,549, "Efficient Grouping of Control and User Data," filed May 2, 2000, J.A. Stevens et al.

U.S. Appl. No. 09/650,332, "Scheduling Techniques for Receiver Directed Broadcast Applications," filed Aug. 29, 2000, C. David Young.

U.S. Appl. No. 09/422,498, "Method and Apparatus for Managing Communication Resources Using Dynamic and Static Assignment of Communication Slots," filed Oct. 21, 1999, C. David Young.

U.S. Appl. No. 09/649,802, "Maintaining an Adaptive Broadcast Channel Using Both Transmitter Directed and Receiver Directed Broadcast," filed Aug. 29, 2000, C. David Young.

U.S. Appl. No. 09/649,665, "Data Communication Techniques for Real Time Data Transmission," filed Aug. 29, 2000, T. Golubiewski et al.

U.S. Appl. No. 09/303,802, "Clique Activation Multiple Access," filed Apr. 30, 1999, C. D. Young et al.

U.S. Appl. No. 09/649,666, "Full Duplex Communication Slot Assignment," filed Aug. 29, 2000, C. David Young.

U.S. Appl. No. 10/689,448, "Heuristics for Combining Inter-Channel and Intra-Channel Communications in a Wireless Environment," filed Oct. 20, 2003, C. David Young et al.

U.S. Appl. No. 09/552,144, "Method and Apparatus for Assigning Receive Slots in a Dynamic Assignment Environment," filed Apr. 19, 2000, C. David Young et al.

U.S. Patent Application titled "On-Demand Broadcast Protocol," filed May 18, 2004, C. David Young et al., (serial no. not yet assigned).

* cited by examiner

ARTERY NODES

FIELD OF THE INVENTION

The invention relates to communications, and more particularly, to a system and method for communicating over a wireless network.

BACKGROUND OF THE INVENTION

Wireless communications networks have found great utility in many commercial and military applications. However, some types of wireless networks become less efficient in transmitting information when a large number of nodes are attempting to communicate thereon.

Previous efforts to increase the efficiency of a wireless network have included the following, all of which are assigned to the same entity as the present application and which are incorporated by reference herein in their entirety:

U.S. Pat. No. 5,949,760, entitled "Simultaneous Channel Access Transmission Method and a Multi-Hop Communications Radio Network";

U.S. Pat. No. 5,719,868, titled "Dynamic Distributed, Multi-Channel Time Division Multiple Access Slot Assignment Method for a Network of Nodes";

U.S. Pat. No. 6,487,186, titled "A Method and Apparatus for Managing Communication Resources Using Bootstrap Slots";

U.S. Pat. No. 6,504,829, titled "A Method and Apparatus for Managing Communication Resources Using Channelized Neighborhoods";

U.S. Pat. No. 6,628,636, titled "A Method and Apparatus for Managing Communication Resources Using Neighbor Segregation";

U.S. Pat. No. 6,317,436, titled "A Method and Apparatus for Managing Communication Resources Using an Adaptive Broadcast Cycle (ABC)";

U.S. Pat. No. 6,331,973, titled "Unifying Slot Assignment Protocol Multiple Access System";

U.S. Pat. No. 6,574,206, titled "A Method and Apparatus for Managing Communication Resources Using Speculation Slots";

U.S. Pat. No. 6,600,754, titled "A Method and Apparatus for Managing Communication Resources Using Standby Slots";

U.S. Pat. No. 6,574,199, titled "Unifying Slot Assignment Protocol Logical Neighborhooding"; and U.S. application Ser. No. 10/689,448, filed Oct. 20, 2003, titled "Heuristics for Combining Inter-Channel and Intra-Channel Communications in a Wireless Communications Environment".

One challenge faced in communications networks is the scheduling of communications slots for each node in the network. In networks with small numbers of nodes it may be efficient to permanently assign a recurring communication slot to each node according to a predetermined schedule. Where large numbers of nodes are involved, however, the permanent pre-assignment of slots may create an unacceptably long communication cycle as each node waits its turn to communicate according to the predetermined schedule. The addition of multiple frequencies or channels may reduce delays by creating more communication slots, but fielded transceivers may not be equipped to communicate on the number of channels required for a large-scale, multi channel, low delay network. One possible solution is to use known Minimum Connected Dominating Set (MCDS) algorithms, but known MCDS solutions have not been used for scheduling communication slots in a network.

It is therefore an object of the invention to provide a communications network that efficiently manages a large number of nodes.

It is another object of the invention to provide a communications network that efficiently schedules communication slots for a plurality of nodes.

A feature of the invention is the formation of an interconnected, arterial sub-network within a communications network, where the nodes in the arterial sub-network assign communication slots to neighboring nodes.

An advantage of the invention is an increase in stability and accessibility to communication slots by nodes in a communications network.

SUMMARY OF THE INVENTION

The invention provides a method of communicating over a network of nodes. According to the method, it is determined whether a first node forms part of an interconnected sub-network within the network. Broadcast slots are assigned to the first node if the first node is part of the sub-network. According to an embodiment of the invention, the first node is permitted to use the assigned broadcast slots to broadcast data to other nodes. Nodes within one hop of the first node but not forming part of the sub-network are permitted to use an assigned broadcast slot if the first node is not using the broadcast slot.

The invention also provides a method of assigning communication time slots to nodes in a wireless network. According to the method, it is determined, for each node in the network, whether the node is part of an interconnected sub-network formed within the wireless network, wherein no node in the network is more than one hop away from a node in the sub-network. Time slots are assigned to nodes in the sub-network. Nodes within the sub-network are permitted to use the assigned time slots to broadcast data to other nodes in the wireless network. A node that is not part of the sub-network is allowed to use an assigned time slot to broadcast data to other nodes in the network if the nodes that are part of the sub-network are not using the assigned time slot.

The invention further provides a wireless communication network having a plurality of nodes. The wireless communication network includes a plurality of artery nodes that comprise an interconnected sub-network within the wireless communication network, The artery nodes are defined so that no node within the wireless communication network is more than one hop away from an artery node. The artery nodes have a plurality of time slots assigned thereto for broadcasting information to adjacent nodes. The network further includes a plurality of non-artery nodes to which at least one of the plurality of time slots is available for broadcasting information to adjacent nodes if one or more of the artery nodes is not using the time slot.

DETAILED DESCRIPTION OF THE DRAWINGS

An embodiment of the invention will now be described in detail. The embodiment employs the concept of artery nodes in the context of channel neighborhoods, which was discussed in U.S. patent application Ser. No. 10/689,448, filed Oct. 20, 2003, entitled "Heuristics For Combining Inter-Channel and Intra-Channel Communications in a Wireless Communications Environment," and incorporated by reference herein in its entirety. As disclosed therein and as restated here, the technique of channel neighborhoods uses a structure of bootstrap slots and broadcast/reservation slots with a combination of heuristics to enhance communications on each of a plurality of channels while allowing reservations to be established as needed between any of the channels. The technique of channel neighborhoods will be described herein, although it is understood that other communications protocols may advantageously incorporate the present invention.

Figure 1:
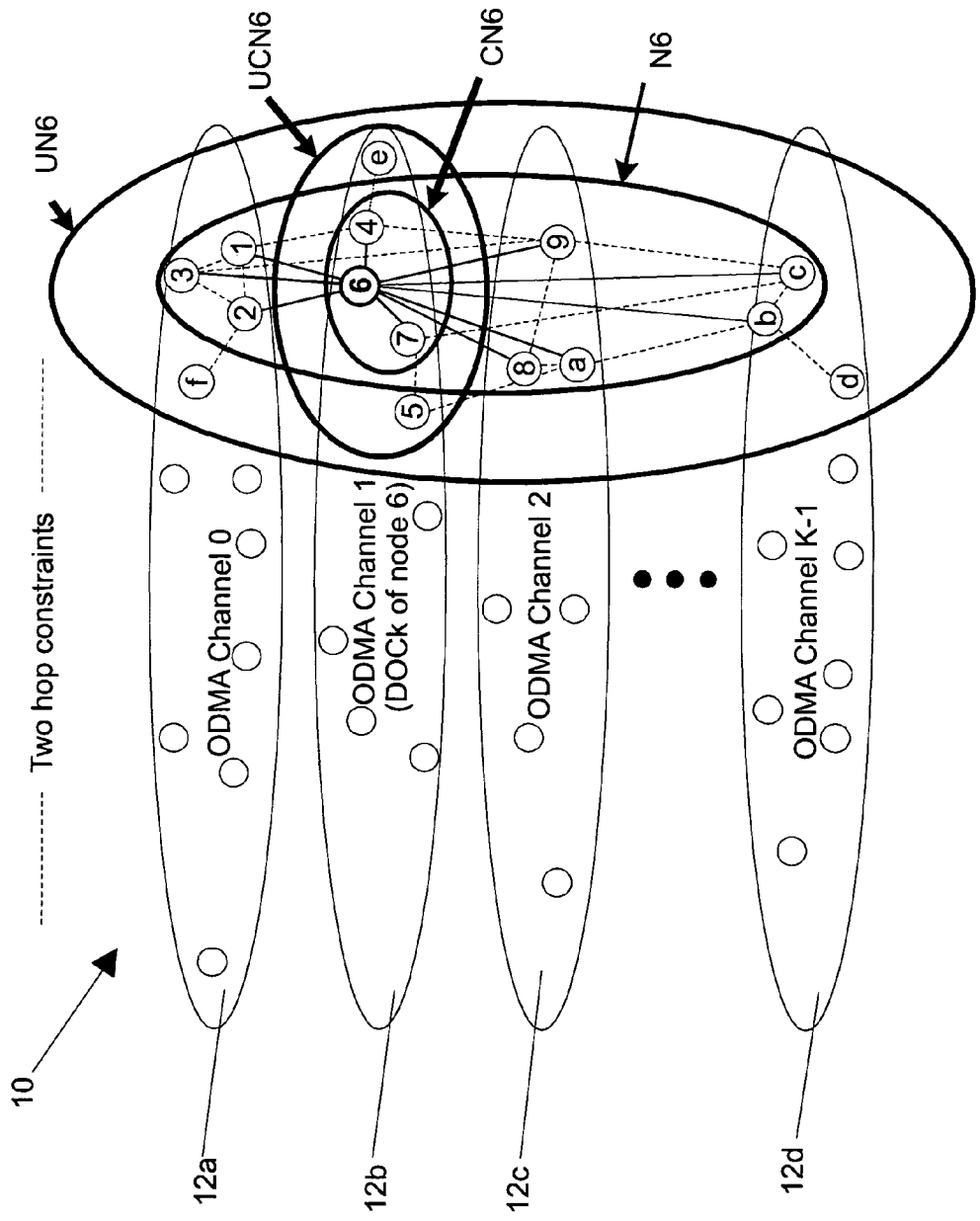
FIG. 1 is a schematic diagram of a communications network.

FIG. 1 depicts a plurality of nodes arranged in a communication network indicated generally by reference number 10. The nodes in network 10 are shown as being arranged in or assigned to one of a plurality of ODMA channels 12a, 12b, 12c, 12d. An ODMA Channel is what is managed to achieve simultaneous transmissions among neighboring nodes in the same Time Domain Multiple Access (TDMA) slot. Each node chooses a Default ODMA Channel k (DOCk) to facilitate communications with other nodes which have chosen the same DOCk. Each node i has a neighborhood Ni, which is the set of 1-hop neighbors of node i on all ODMA channels. Ni is unique to node i and is able to span the ODMA channels because the Ni bootstraps are monitored by all of its neighbors regardless of their DOCk. For example, the neighborhood of node 6 is identified as N6 and includes nodes 1, 2, 3, 4, 7, 8, 9, a, b, and c.

Each node i also has a USAP Neighborhood UNi, which is defined as the unique set of neighbors of node i and the neighbors of these neighbors (all nodes within 2 hops of a node i) on all ODMA channels. The subset of UNi that is 2 hops away on other DOCks is visible to i only in terms of USAP constraints, not node IDs. UNi is unique to node i and is able to span the ODMA channels because the bootstraps are monitored by all of its neighbors regardless of their DOCk. For example, the USAP neighborhood of node 6 is identified as UN6 and includes nodes 1, 2, 3, 4, 5, 7, 8, 9, a, b, c, d, e, and f.

Each node i also has a Channel Neighborhood CNi, which is defined as the set of 1-hop neighbors of node i sharing the same DOCk as i. In other words, a CNi is the subset of UNi that are direct neighbors of node i sharing the same DOCk as i. By sharing the same DOCk, node i can transmit to members of CNi using its rotating broadcast slots. The Channel neighborhood of node 6 is identified as CN6 and includes nodes 4 and 7.

Each node i further has a USAP Channel Neighborhood UCNi, which is defined as the set of neighbors of node i and the neighbors of these neighbors (all nodes within 2 hops of a node i) sharing the same DOCk as node i. All nodes within the UCNi are visible to node i both in terms of the USAP constraints from bootstrap packets and node IDs from monitor packets. The USAP channel neighborhood of node 6 is identified as UCN6 and includes nodes 4, 5, 7, and e.

Figure 2:
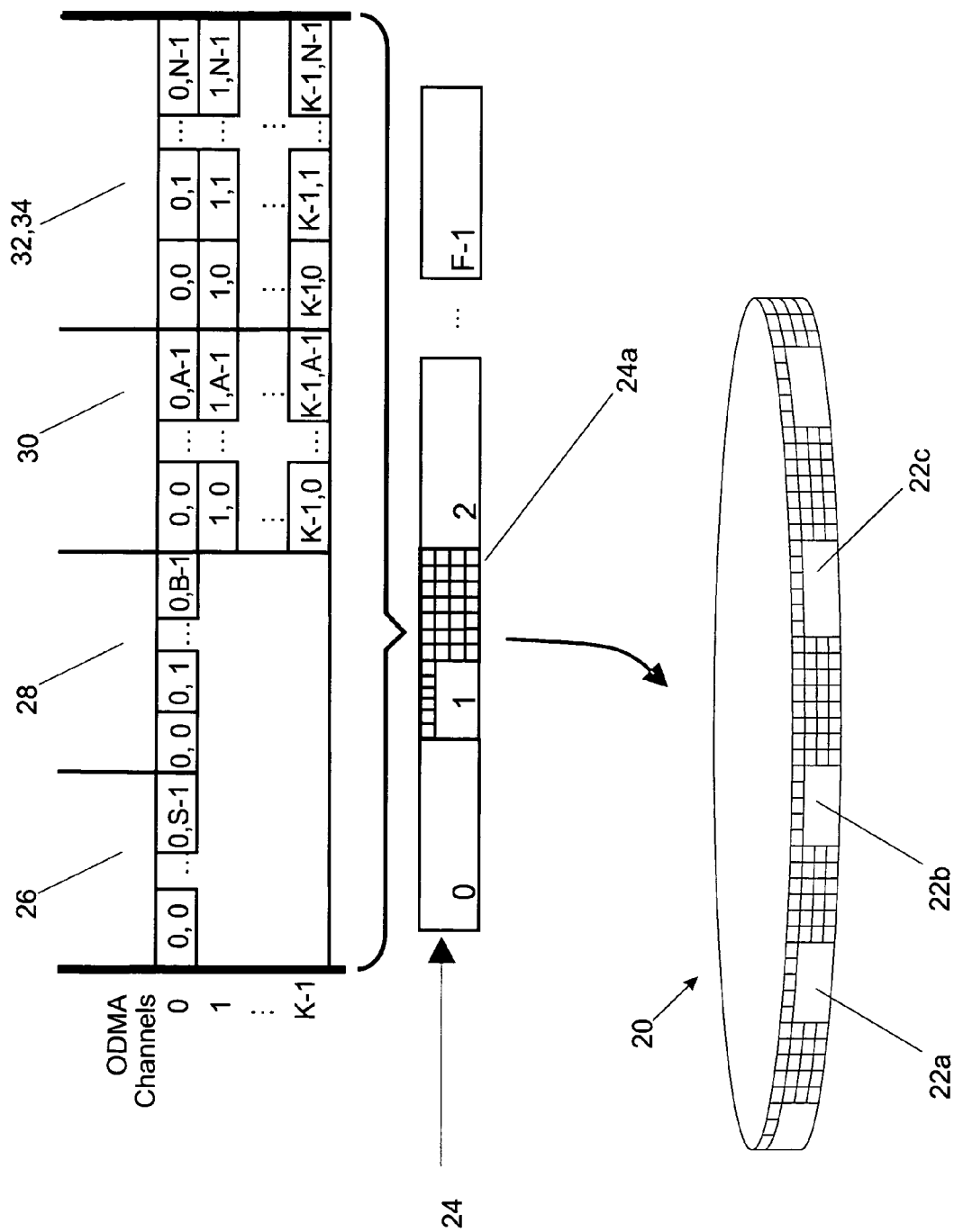
FIG. 2 is a schematic diagram of a multi-channel broadcast cycle.

FIG. 2 depicts an ODMA cycle 20 comprising a series of consecutively occurring and cyclically repeating frames, of which frames 22a, 22b, and 22c are exemplary. The frames are shown in linear form at 24. Each frame is subdivided into a plurality of slots, as shown with frame 24a. There are several types of slots in each frame. For instance, synchronization (sync) slots 26 are used to convey information needed to allow partitioned networks to merge as specified by time synchronization protocols. Ni bootstrap (NiB) slots 28 are used to transmit low rate common channel bootstrap data containing USAP information for allocating fixed reservation slots. NiB slots 28 are transmitted on a common channel and are received by all neighbors of a broadcasting node. Each NiB slot is pre-assigned and unique to every node in the network. A Ni Bootstrap Slot Position of node i (NSPi) corresponds to the unique slot within the Ni bootstrap cycle that node i has been assigned to transmit its Ni bootstrap. A Ni Bootstrap Slot Position of node j as known by node i (NSPj) is the NSP that node i knows about other nodes j. The correspondence between the NSPj and node IDs is loaded along with other configuration information, making the NSPj a more efficient means of addressing transmissions to specific neighbors without using full node IDs.

Each frame also includes one or more CNi Bootstrap (CNiB) slots 30, which is where the higher rate channel bootstrap is transmitted containing USAP information for assigning CNiB slots and RBSs. CNiB slots are received by neighbors of a node within the CNi. The CNi bootstrap slot is assigned dynamically and bears no relationship to the NSPi, which is assigned statically during configuration.

A Rotating Broadcast Slot (RBS) 32 is used for node activation. If reserved via the CNiB, RBS 32 provides contentionless access for a single node within UCNi. Outside of UCNi the RBS can be reused. The RBS also provides contention access if not reserved or if reserved and the owner indicates that it will not transmit in it in the near future, which will be discussed more fully herein with respect to slot headers. The RBS is also staggered from one frame to the next to minimize the impact on any one node when a Fixed Reservation Slot is assigned (which takes precedence over an RBS occurring in the same frame).

Fixed Reservation Slots (FRS) 32 are used for link or node activation. If reserved via the NiB it provides contentionless access for a single node within UNi. Outside of UNi it can be reused. The FRS is repeated in the same slot in each frame and replaces an RBS that may occur in the same frame. It is primarily intended for communications between ODMA channels but could also be assigned between nodes on the same DOCk.

As stated above, Rotating Broadcast Slots and Fixed Reservation Slots provide a means for contentionless access. For the purposes of this disclosure, contention or contention access occurs when more than a single node attempts to transmit in an unreserved slot or in a reserved slot that is not currently being used for transmission by its owner. If more than one node in a neighborhood actually transmits in a contended slot there is a chance that their transmissions may collide at the intended receiver(s), thereby preventing them from being received correctly. To reduce the chance of collision each of the contending transmitters may use a pseudorandom delay to determine whether it actually transmits in any given contention slot. The use of RBS and FRS provide another way to reduce the chance of message collision.

Figure 3:
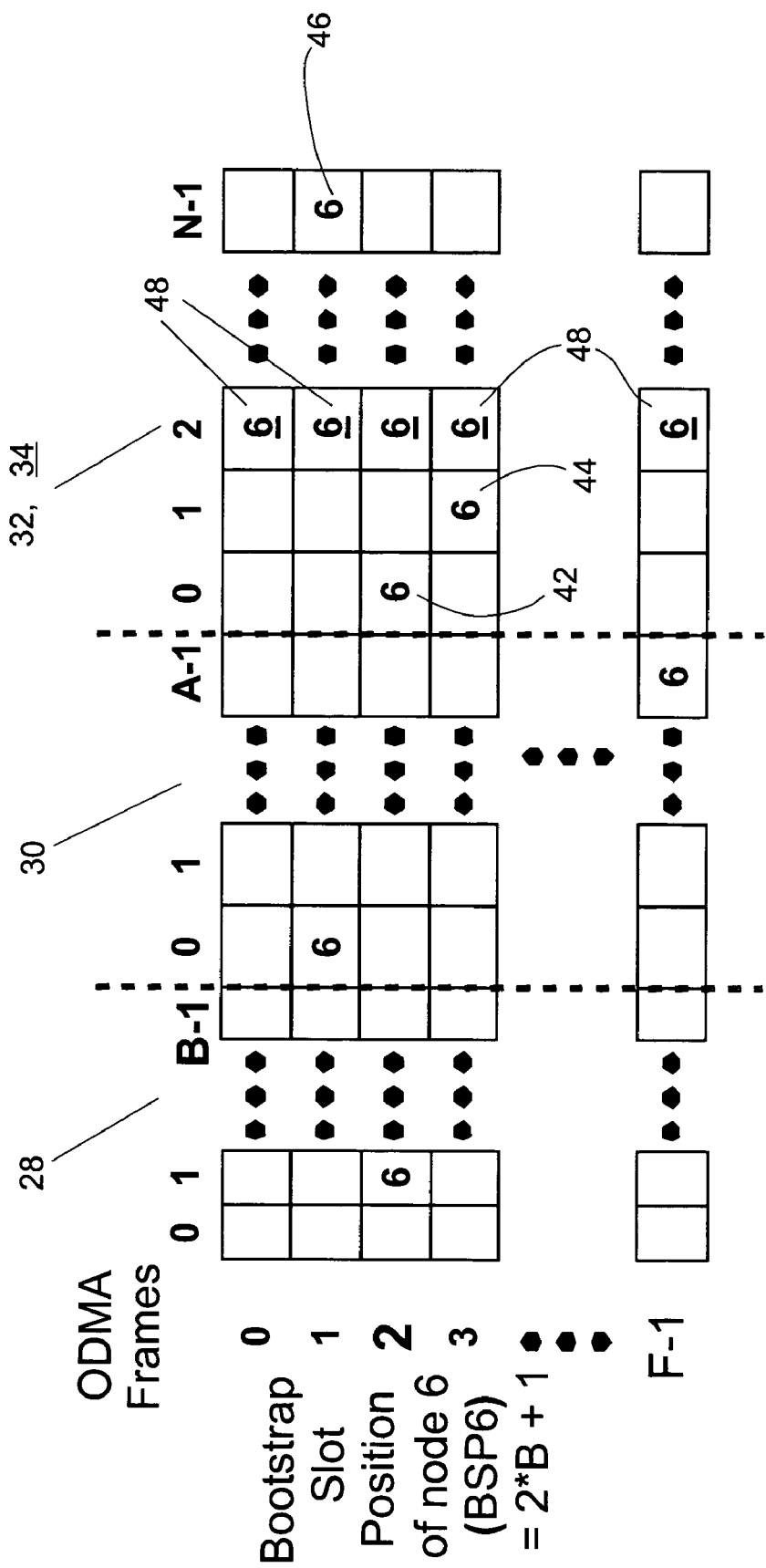
FIG. 3 is a chart showing slot assignments for multiple time frames on a single communications channel.

The different types of slots are shown in FIG. 3, which depicts slots in a single channel during consecutive frames. Node 6 uses NiB slot 1 during frame 2. Node 6 uses CNiB slot 0 during frame 1 and CNiB slot A-1 during frame F-1. Node 6 has also been assigned staggered Rotating Broadcast Slots 42, 44, 46. Node 6 further is using slot 2 during all frames to transmit using Fixed Reservation Slots 48. Note that the Fixed Reservation Slots take precedence over Rotating Broadcast Slots.

While the sync and bootstrap slots are on a common (pseudo randomized) channel, such as channel 0 in FIG. 2, the rest of the slots occur in multiple channels of the ODMA frame. These are used for RBS and FRS on an ODMA channel to carry routine traffic between nodes on that channel. In addition, they can be assigned on other channels for enhanced communications between channels.

The sync slots are just large enough to accommodate the smallest amount of information needed to allow partitioned networks to merge. The number of these slots determines how quickly they can merge. The Ni and CNi bootstrap slots are just large enough to hold an Ni or CNi bootstrap packet, respectively. The remaining slots fill the rest of the frame. Their number factors into the broadcast cycle, the maximum number of nodes that can perform a rotating broadcast in a single frame, and their size determines the maximum amount of information in a single transmission. Their number and size combine to determine the frame latency.

The data typically transmitted during a bootstrap slot comprises a bootstrap packet. The two types of bootstrap packets, i.e., NiB and CNiB, are used for spreading different types of USAP information. For example, the NiB packet is transmitted in the preassigned Ni bootstrap slot. It is used for assigning reservations between nodes on different ODMA channels. It uses USAP information to reserve FRS slots. These slots repeat on the selected channel in every frame for increased bandwidth between nodes that may or may not have the same DOCk. Each NiB contains the following information:

- a node's ID. Neighbors of the node record the association of this node ID with the NiB slot.
- Whether the node is an advantaged node or not. A node that is advertising itself as advantaged would cause its non-advantaged neighbors to treat it as described further herein.
- Which DOCk and CNiB have been chosen by the node. This information helps nodes detect when they or their neighbors have unluckily chosen the same CNiB.
- An Ni nodality metric so that a node entering the network would aid in knowing how much randomization to use on NiB contention slots. This would allow the new node to establish itself quicker than waiting for an entire NiB cycle.
- USAP information to reserve FRSs. These slots repeat on the selected channel in every frame for increased bandwidth between nodes that may or may not have the same DOCk.

The CNiB packet is transmitted in the CNi bootstrap slot. It is used for assigning CNiB slots and RBSs between nodes on the same ODMA channel. It uses USAP information to assign CNiB slots. It also uses USAP information to assign RBSs, which repeat on the selected channel according to the staggered RBS schedule for increased bandwidth between nodes that have the same DOCk. Each CNiB may contain the following information:

- a node's ID.
- A CNi nodality metric so that a node entering the network would aid in knowing how much randomization to use on CNiB and RBS contention slots. This would allow the new node to establish itself quicker than waiting for an entire CNiB cycle.
- USAP information to reserve CNiB slots. These slots repeat every CNiB cycle. A node that wishes to reserve a RBS slot can reserve a CNiB slot so that USAP can advertise the constraints consistently.
- USAP information to reserve RBS slots. These slots repeat every frame except that they are shifted by one slot until they arrive at their original position every RBS cycle.
- Information sufficient to identify a node or its neighbors as an artery node if this is not included in a separate monitor packet, as will be further explained below.

The NiB is transmitted on a common channel so that it can be heard by all neighbors of i. It contains USAP information for reserving FRSs. The CNiB is transmitted concurrently by all nodes using the same slot on their assigned DOCks. Thus it is intended only for neighbors of node i on the same DOCk and contains USAP information for assigning CNiB slots and RBSs.

Each type of bootstrap has its own cycle. The NiB cycle is relatively long so that it is most suitable for long-lived, stable reservations. This is intended for maintaining unicast communications between DOCks. The CNiB cycle on the other hand is as short as possible to minimize latency in response to surges of bursty traffic within a DOCk. The shorter cycle is possible because the nodes of one DOCk are transmitting the CNiBs concurrently with the nodes of other DOCks.

Because the NiB cycle is relatively long, it is useful to have some additional NiB slots that are used on a contention basis. NiBs are the vehicle for assigning FRSs between DOCks and are used on relatively stable, long-lived links. To decrease the latency in initially assigning the slots, the contention slots are used. In other words, if the scheduled NiB slot is not close in time, the assignment is first announced in a NiB contention slot to get it established and after that just in the NiB scheduled slot for maintenance.

Because the CNiB slots are assigned dynamically, a large pool of them should be available for stability. This allows a denser neighborhood, especially when 3-hop reuse is in effect, as further described herein. Also, additional slots allow contention access to reduce the latency of nodes trying to set up reservations for longer term sessions. The number of CNiB slots should also be great enough to allow each DOCk member to assign itself a slot for the case of uniform traffic. This allows for a graceful degradation of service without excluding nodes from the network.

The dynamic assignment of CNiB slots also opens the possibility of conflicting assignments. This is the reason that the CNiB of a node is listed in its NiB. If the conflicting assignments are for direct neighbors then the direct neighbors should recognize the conflict by hearing each other's NiBs announcing the same CNiB on the same DOCk. A conflict will also be declared if there is an intervening neighbor that, recognizing that both of these nodes are reporting the same CNiB slots in their NiBs. In this case the CNiB is being reused after only 2 hops and a conflict will be declared.

To join a neighborhood, a node advertises its DOCk in the NiB. As part of the neighborhood, the node does one or more of the following:

The node assigns a CNi bootstrap slot and RBS(s) as required by its traffic needs.

The node increases its transmission capacity in the DOCk by reserving RBSs. It can also add a link to another DOCk with an FRS via the NiB.

A node with an assigned RBS transmits monitor packets, which contain lists of neighbors and other information to be shared with neighbors on the same DOCk, and traffic to its neighbors on the same DOCk.

Without an assigned RBS the monitor packets and traffic are transmitted much less frequently using loaned RBSs or contention on unused or yielded RBSs.

Once a node starts transmitting, its neighbors measure its received link qualities. They in turn feed back the received link metrics back to the transmitters using the monitor packets. These are then used to adapt transmission parameters.

A transmission fits within the boundaries of the type of slot for which it is intended. The transmission is built up of cells whose size is fixed and determined by the communications plan. The format of a transmission includes a slot header, which contains the following information:

Identification of the transmitting node.

A bit indicating whether this slot is assigned for RBS transmission by this node.

A number indicating the transmit needs of this node. The higher the transmit needs the more likely it is that a neighbor with an assigned but unused RBS slot will loan it to this node.

A bit map indicating which of the transmitting node's upcoming RBS slots will be used. Allocated but unused RBS slots can be loaned to a specific neighbor or yielded for contention.

The NSP of a neighbor node to which this node is loaning the unused RBS slots. If this node is not loaning its unused RBS slots, then the unused RBS slots are yielded for contention.

Number of entries in the Cell header array.

A Cyclic Redundancy Check (CRC) covering previous fields

The maximum number of cells that will fit in each transmission type is dependent on the data rate in effect for the intended slot. If while building a transmission of a certain type, there are not enough cells available for the primary use of the slot, cells of other types can be inserted to fill the transmission as long as the intended receiver(s) of the transmission match the intended receiver(s) of the cells. In particular, if a slot has been reserved and cells with the corresponding reservation ID have been exhausted, cells with no reservation ID can be inserted.

USAP

Reference has been made herein to the Unifying Slot Assignment Protocol (USAP). Briefly, USAP dynamically assigns TDMA (or ODMA) slots using information shared in bootstrap packets. The network uses USAP to allocate unicast and broadcast slots to support point-to-point and point-to-multipoint communications between neighboring nodes.

Figure 5:
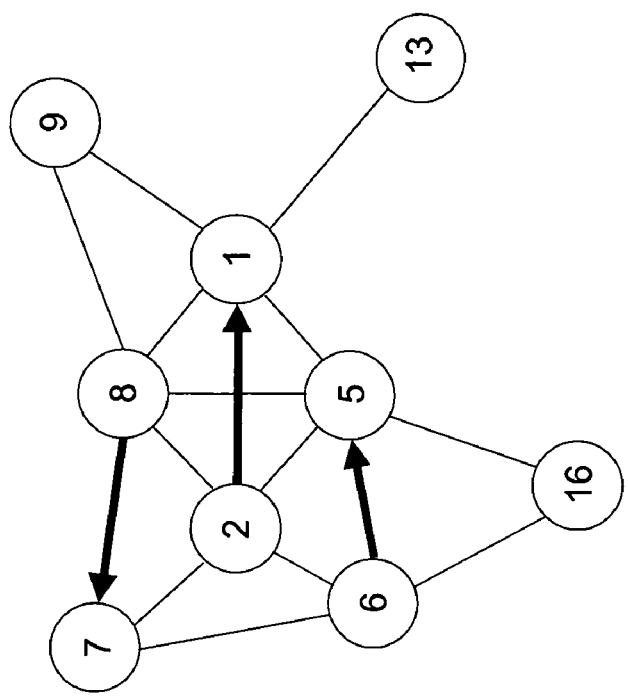
FIG. 5 is a schematic diagram of another communications network.
Figure 4:
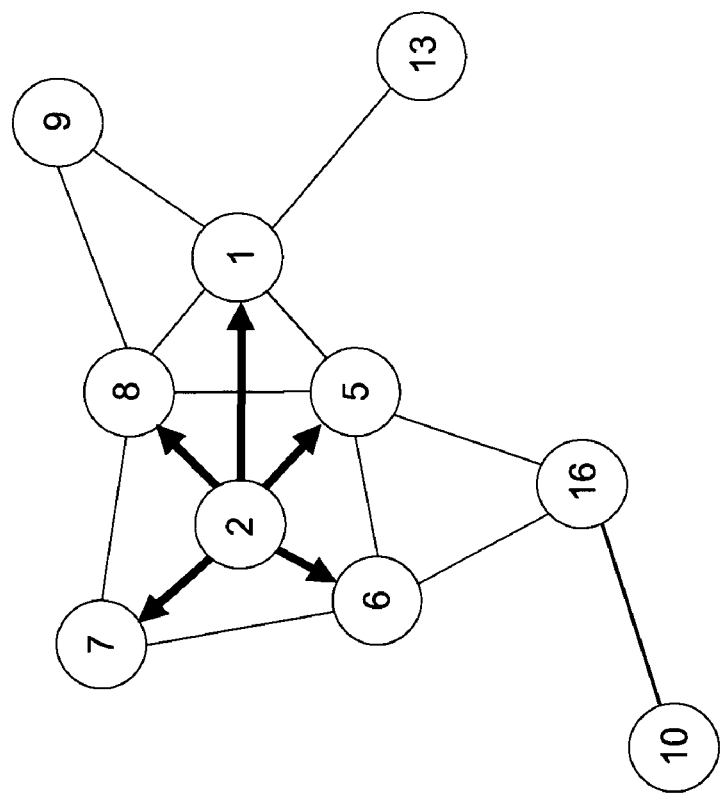
FIG. 4 is a schematic diagram of a communications network.

Traditionally, there are two methods in which a node transmits to its neighbors. The first, known as "node activation" or "broadcast", is shown in FIG. 4. Node activation has a transmitter, such as node 2, broadcast to all of its neighbors at once rather than individually. The second method, known as "link activation" or "unicast" and shown in FIG. 5, occurs when a transmitter such as node 2 intends to have only one receiver, such as node 1. Node activation allows only one active transmitter in a neighborhood, while link activation can potentially have several transmitters at a time in the same neighborhood.

USAP provides support for both broadcast and unicast. The broadcast assignment is used for Rotating Broadcast Slots. The unicast assignment is used for Fixed Reservation Slots to reserve capacity between two nodes on the same or different ODMA channels.

When a node chooses an allocation, USAP enforces constraints to avoid interference within 2 hops of the transmitting node. As used herein, "allocation" refers to an ordered pair of Radio Frequency (RF) channel and time slot. A node ensures that its allocations satisfy the USAP constraints by sharing the following slot sets with its neighbors:

$ST_i$—allocations where a node is transmitting
$SR_i$—allocations where a node is receiving
$NT_i$—allocations where a node's neighbors are transmitting These slot sets are transmitted in the bootstrap packets. This information, exchanged between neighboring nodes, is used by the USAP such that nodes may choose non-conflicting transmit allocations consistent with the most recent topology measurements and detect and report conflicts caused by topology changes.

The USAP information is exchanged in the two different kinds of bootstraps, namely, the CNi bootstrap (CNiB) and the Ni bootstrap (NiB). Although exact format of each of these is a function of the communications plan, the bootstrap nodes contain certain information as described herein. Furthermore, for an FRS, every member of the $ST_i$ or $SR_i$ set has a corresponding receiving id field to indicate the intended receiver. The receiving id will include bits to indicate which channel will be used. This should always be the receiver's DOCk except if the receiver has just moved to a different DOCk, in which case USAP will keep the FRSs on the original DOCk until they are released or a conflict is detected. To have enough USAP information to maintain the FRSs on the original DOCk, the receiver id and channel information shall be included in both the transmitter's and receiver's NiB.

To choose an FRS slot, a node first generates the set of slots that are not available because they are already in use locally. In the description that follows, the subscript of "i" denotes information about this node and "j" denotes the corresponding information reported by a neighboring node.

Slot Assignments:
S=set of slots
F=set of channels

Self Transmit/Receive Sets:
$STN_i(s,f)$=set of neighbors to which node i transmits on (s,f)
$SRN_i(s,f)$=set of neighbors from which node i receives on (s,f)

from which the following sets are derived:
$ST_i(s,f)$=set of allocations for which $STN_i(s,f)$ is not empty
$SR_i(s,f)$=set of allocations for which $SRN_i(s,f)$ is not empty Neighbor Transmit/Receive Sets:
$ST_j(s,f)$=the $ST_i(s,f)$ reported by neighbor j
$SR_j(s,f)$=the $SR_i(s,f)$ reported by neighbor j from which the following sets are derived:
$NT_i(s,f)=\cup ST_j(s,f)$ over all neighbors j of node i
$NR_i(s,f)=\cup SR_j(s,f)$ over all neighbors j of node i
$NT_j(s,f)$=the $NT_i(s,f)$ reported by neighbor j A node i or its neighbor j transmitting or receiving (on any channel) in slot s, is blocked from using slot s on any other ODMA channel. To this end the following derived sets are useful:

$Bi(s)=STi(s,f) \cup SRi(s,f)$ for any f $Bj(s)=STj(s,f) \cup SRj(s,f)$ for any f $CoNRi(s)= \cup SRj(s,f)$ for any f over all Co-sited neighbors j of node i To decide what slots and channels are available for FRS unicast allocation, a node i constructs the blocked allocations for transmitting to j by excluding allocations

| | |
|---|---|
| whose slot is already assigned to either node | $Bi(s) \cup Bj(s)$ |
| i's co-sited neighbors are receiving in | $CoNRi(s)$ |
| i's neighbors are receiving in | $NRi(s, f)$ |
| j's neighbors are transmitting in | $NTj(s, f)$ |

This information is combined as follows:

$$\text{Blocked}(i, j, s, f) = Bi(s) \cup Bj(s) \cup CoNRi(s) \cup NRi(s, f) \cup NTj(s, f)$$

$$= \text{set of allocations where } i \text{ cannot transmit to } j$$

To decide what slots are available for FRS broadcast allocation on a particular channel f, a node i could construct the blocked allocations for transmitting to its neighbors on f by excluding allocations

| | |
|---|---|
| whose slot is already assigned to i | $Bi(s)$ |
| whose slot is already assigned to any of its neighbors on f | $\cup_{\forall n \in \{i's\_nbrs\}} Bj(s)$ |
| i's co-sited neighbors on any channel are receiving in | $CoNRi(s)$ |
| any of i's neighbors' neighbors on f are transmitting in | $\cup_{\forall n \in \{i's\_nbrs\}} NTj(s, f)$ |

This information is combined as follows:

$$\text{Blocked}(i, s, f) = Bi(s) \cup_{\forall n \in \{i's\_nbrs\}} Bj(s) \cup CoNRi(s) \cup_{\forall n \in \{i's\_nbrs\}} NTj(s, f)$$

$$= \text{set of allocations where } i \text{ cannot transmit to its neighbors on } f$$

CNiB and RBS slots are allocated with 3-hop constraints if possible. This is illustrated in FIG. 4, in which node 9 would be permitted to use the same channel as node 10 because the nodes are more than three hops apart from each other.

To decide what slots are available for CNiB or RBS broadcast allocation on a particular channel f, a node i constructs the blocked allocations for transmitting to its neighbors on f.

To enforce 3-hop reuse a new set is defined:

$NNTi(s)= \cup SRj(s,f)$ over all neighbors j of node i on channel f, but only if (s,f) is not also a member of $Sri(s,f)$ or the transmitter in (s,f) is not a neighbor of j. This latter clause prevents two neighbors of a transmitter from reporting an NNTi as a result of hearing each other's Sri, thereby causing the transmitter to falsely detect a 3-hop conflict.

by excluding allocations

| | |
|---|---|
| whose slot is already assigned to i or any of its neighbors | $\cup_{\forall n \in \{i's\_nbrs\}} Bj(s)$ |
| i's neighbors neighbors are transmitting in | $\cup_{\forall n \in \{i's\_nbrs\}} NNTj(s)$ |

This information is combined to identify allocations where i cannot transmit:

$\text{Blocked}(i,s) = \cup_{\forall n \in \{i's\_nbrs\}} Bj(s) \cup_{\forall n \in \{i's\_nbrs\}} NNTj(s)$ If all slots are blocked under 3-hop constraints the information can be combined to give 2-hop reuse:

$\text{Blocked}(i,s) = \cup_{\forall n \in \{i's\_nbrs\}} Bj(s)$

Yielding and Loaning RBS Slots

A node temporarily gives up the use of future allocated RBS slots when it does not have traffic to transmit. In its simplest form the node "yields" the slots for contention access by its neighbors. A node could "loan" the slots to a particular neighbor but this requires that the RBS slots satisfy 3-hop constraints like those of CNiB slots. A node that owns a 3-hop constrained RBS slot is able to loan it to a neighbor so that the latter can transmit in it without violating the 2-hop USAP constraints.

As previously discussed, the slot header includes a number to indicate how much traffic a node has to send (its transmit needs). A neighboring node that has an assigned RBS slot and has little traffic of its own could loan the slot to a neighbor with a high load. The slot header also includes a bit map indicating which reserved RBS slots will be used in the upcoming frame(s) and a field to specify the NSP of the neighbor that the slot is loaned to. If the NSP is NULL then the slots are yielded rather than loaned.

An RBS owner can continue to loan upcoming unused slots for as long as a neighbor indicates a need. If more than one neighbor indicates a high load then the owner of the RBS slot is the arbiter for loaning the slot, thereby eliminating contention for that slot.

By using the mechanisms just described, a node in a network yields unused RBS slots or loans the slots to a particular neighbor. A node that has yielded or loaned an upcoming RBS slot does not transmit in the slot. This includes the case that traffic for transmission has arrived prior to the slot.

Artery Nodes

Figure 6:
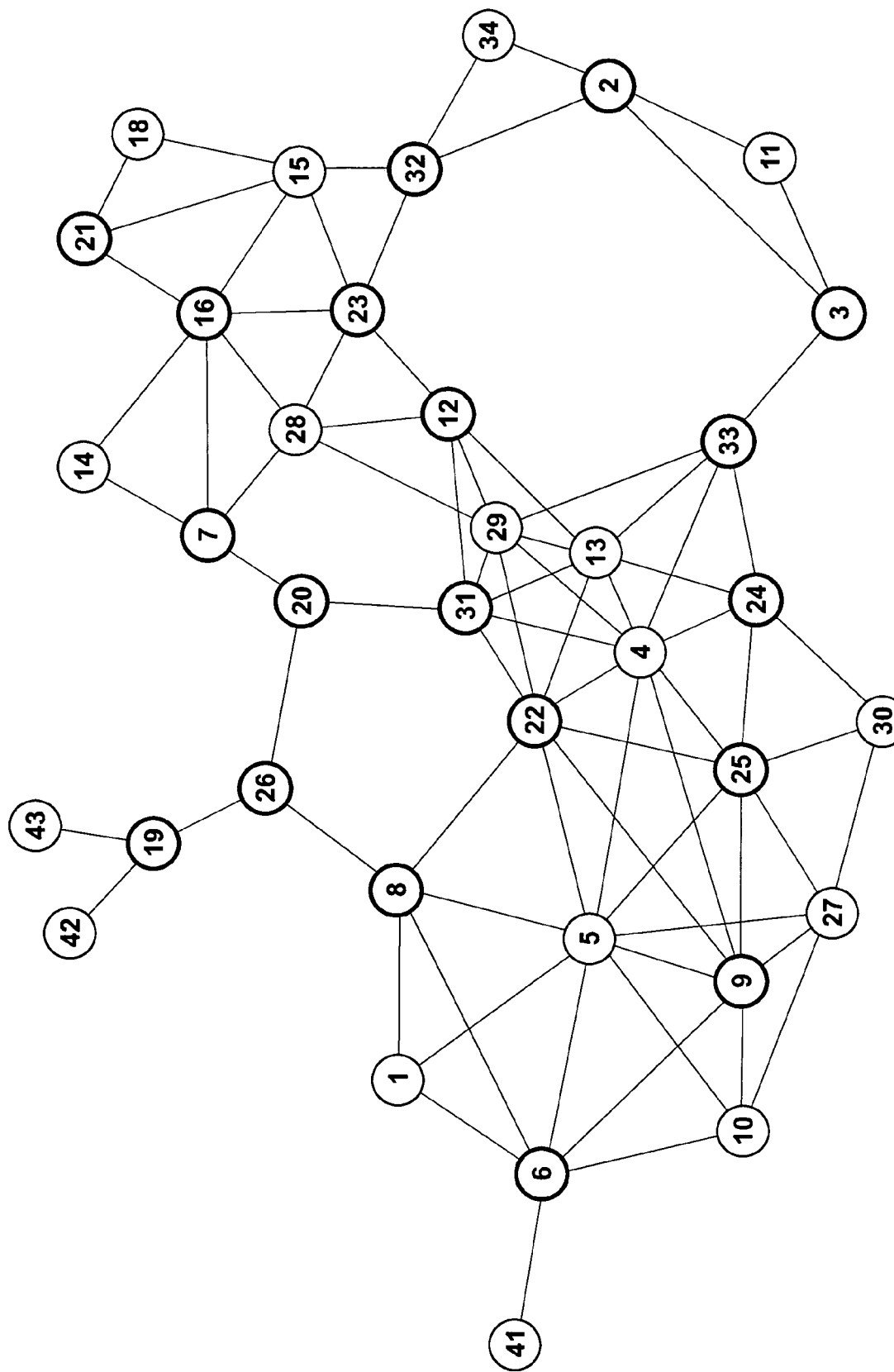
FIG. 6 is a schematic diagram of a communications network using artery nodes.

Artery nodes are designed to improve the efficient use of channel resources for bursty traffic, which occurs when certain nodes are permitted to increase their capacity and reduce their latency by assigning themselves RBSs. Under bursty traffic conditions it can be inefficient, and in very dense networks perhaps not even possible, to permanently assign every node an RBS since much of the time many nodes may have little to transmit. Channel access performance can be improved under these conditions if certain nodes reserve one or more RBSs while the remaining nodes access these nodes via contention or loaning. The nodes that reserve one or more RBSs can be termed artery nodes, and are selected so as to form an interconnected, arterial sub-network within the communications network. As shown in FIG. 6, dark circles are depicted around artery nodes 6, 8, 26, 19, 20, 7, 16, 21, 23, 12, 31, 22, 9, 25, 24, 33, 3, 2, and 32, while lighter circles are depicted around those nodes that are not artery nodes. The artery nodes assign themselves RBSs which can be made available to the non-artery nodes using contention or loaning protocols.

To determine whether a node should be an artery node, each node first defines a set of Artery Node Neighbors (ANN) as (a) the set of neighbors to the node that have announced themselves as artery nodes, and (b) the node itself if the node is currently assigned to be an artery node. Each node announces its artery node status and its ANN periodically in its monitor packets. The node will then examine the artery node status of its neighbors along with their ANNs to decide if it should become an artery node. In doing so the following algorithm preferably is followed:

If ((a node has no artery node neighbors)
    OR (two neighbor ANNs (excluding this node) are disjoint))
    be an artery node.

Else
    do not be an artery node.

Taking node 6 in FIG. 6 as an example, if node 6 has no artery node neighbors, node 6 should be an artery node. Node 6 also should assign itself to be artery node if the list of ANNs of any two neighbors of node 6 are disjoint or otherwise unconnected. If node 6 cannot satisfy either of these conditions, node 6 should not be an artery node. This simple rule yields an important set of properties. First, it ensures every node is at most one hop from an artery node. Second, disjoint sets of artery nodes are always connected. Third, unnecessary artery nodes are pruned or avoided. What is left is a continuous network of artery nodes with increased capacity and reduced latency due to the artery nodes' contentionless access to the communications channel. Because every node is, at most, one hop from the artery node network, contention along a route to any destination is limited to the first hop and is contention-free if an artery node is the source of a transmitted message.

Figure 7:
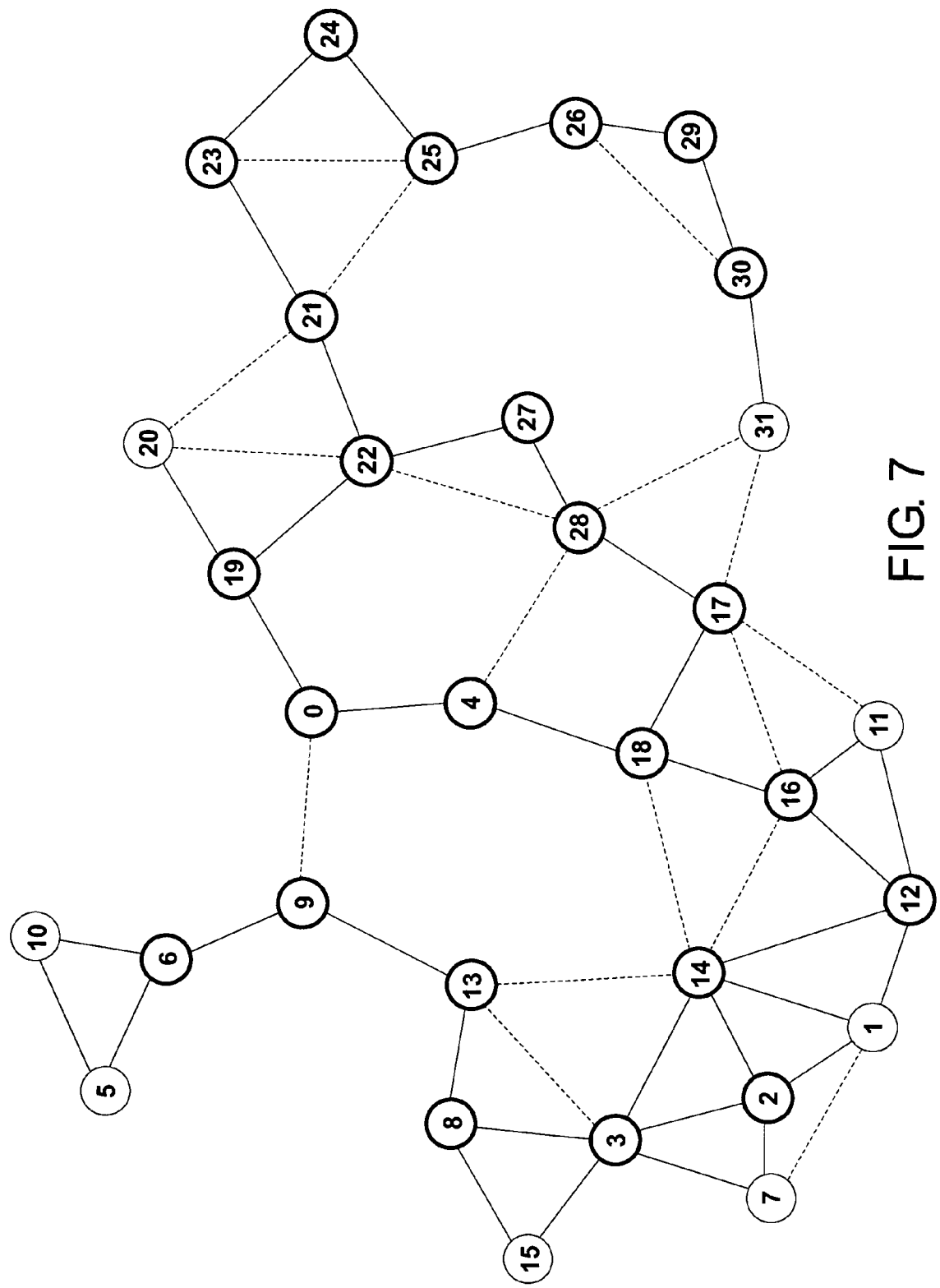
FIG. 7 is a schematic diagram of a very sparse communications network using artery nodes.
Figure 8:
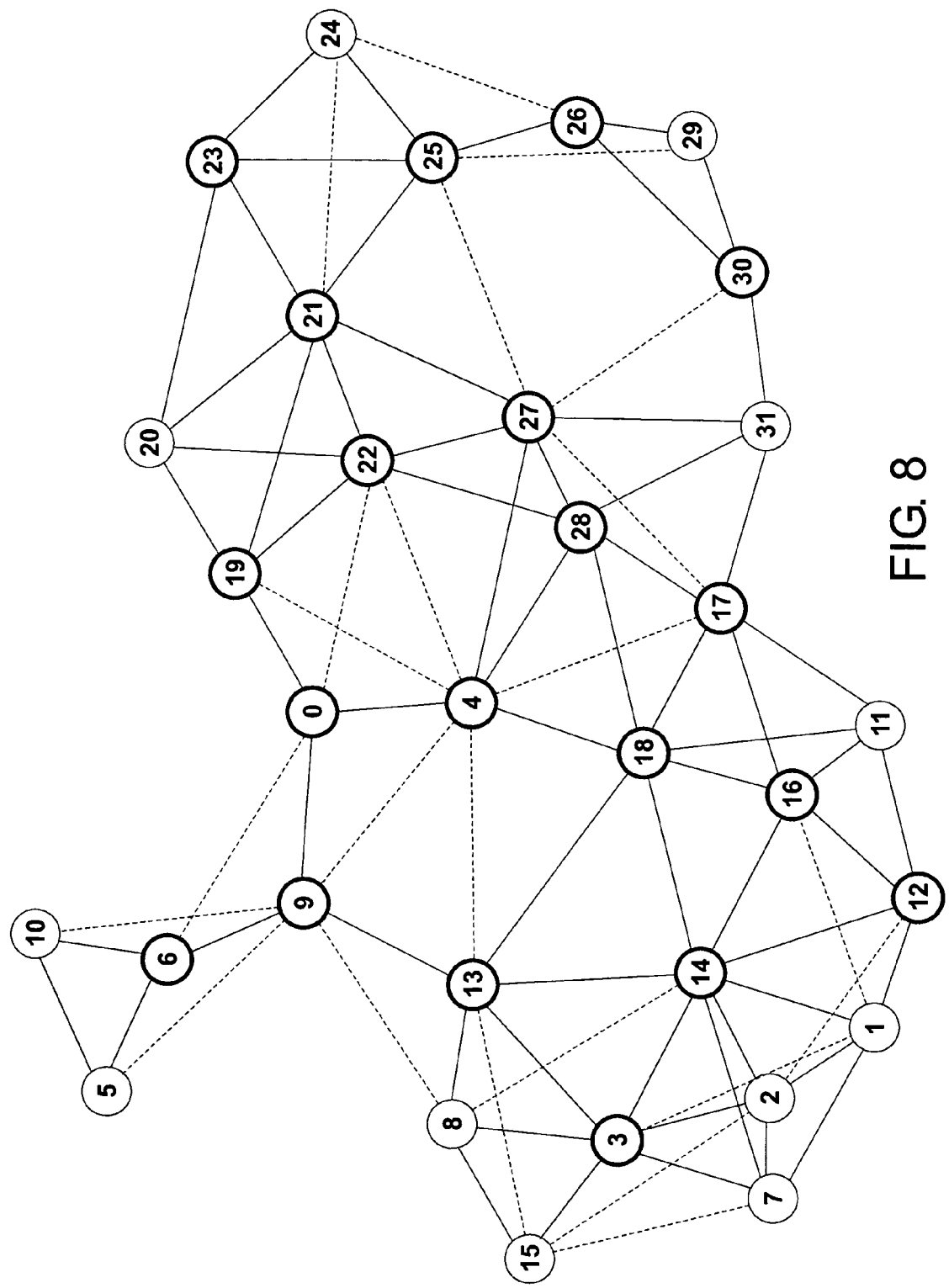
FIG. 8 is a schematic diagram of a sparse communications network using artery nodes.
Figure 9:
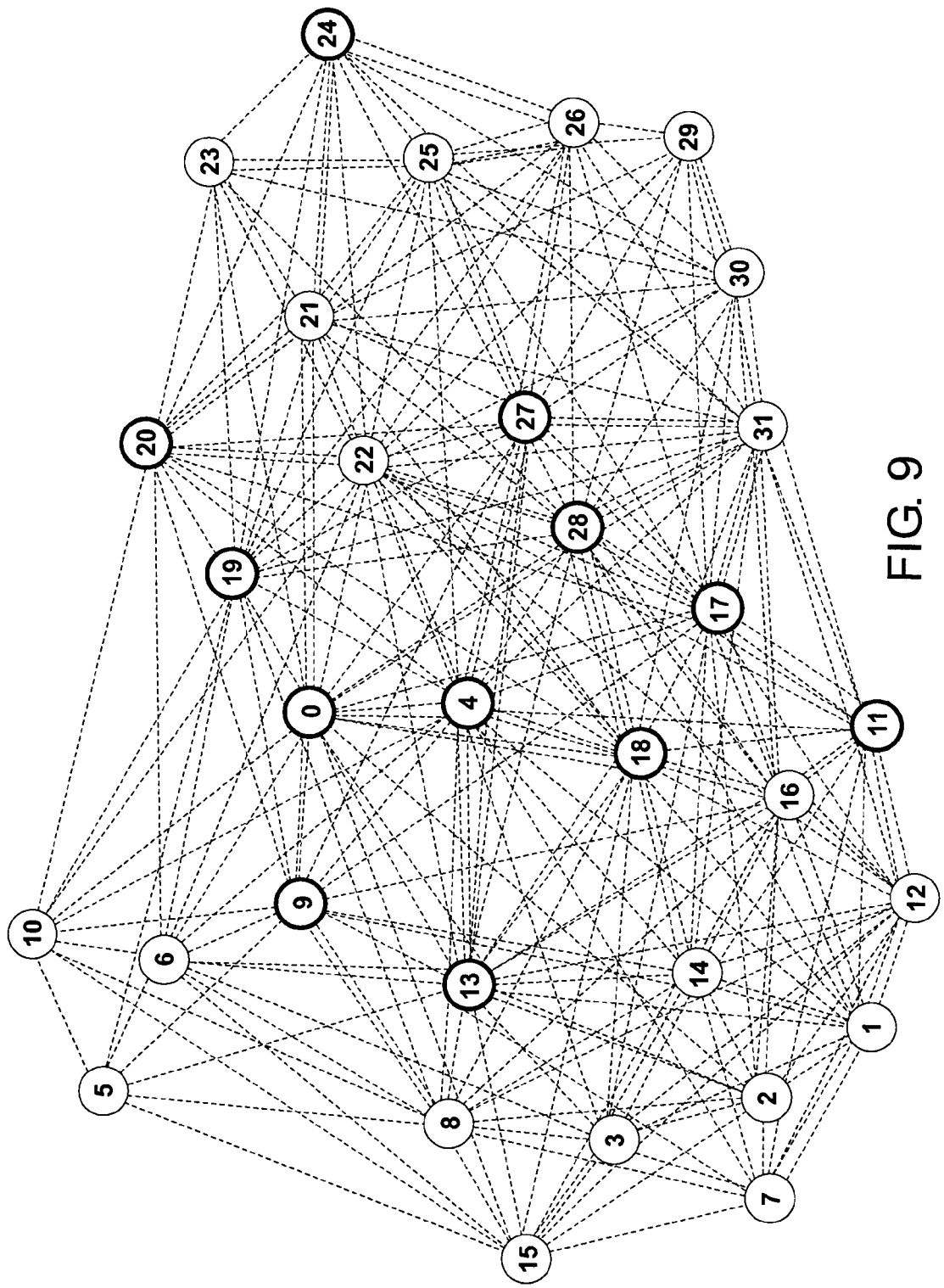
FIG. 9 is a schematic diagram of a dense communications network using artery nodes.
Figure 10:
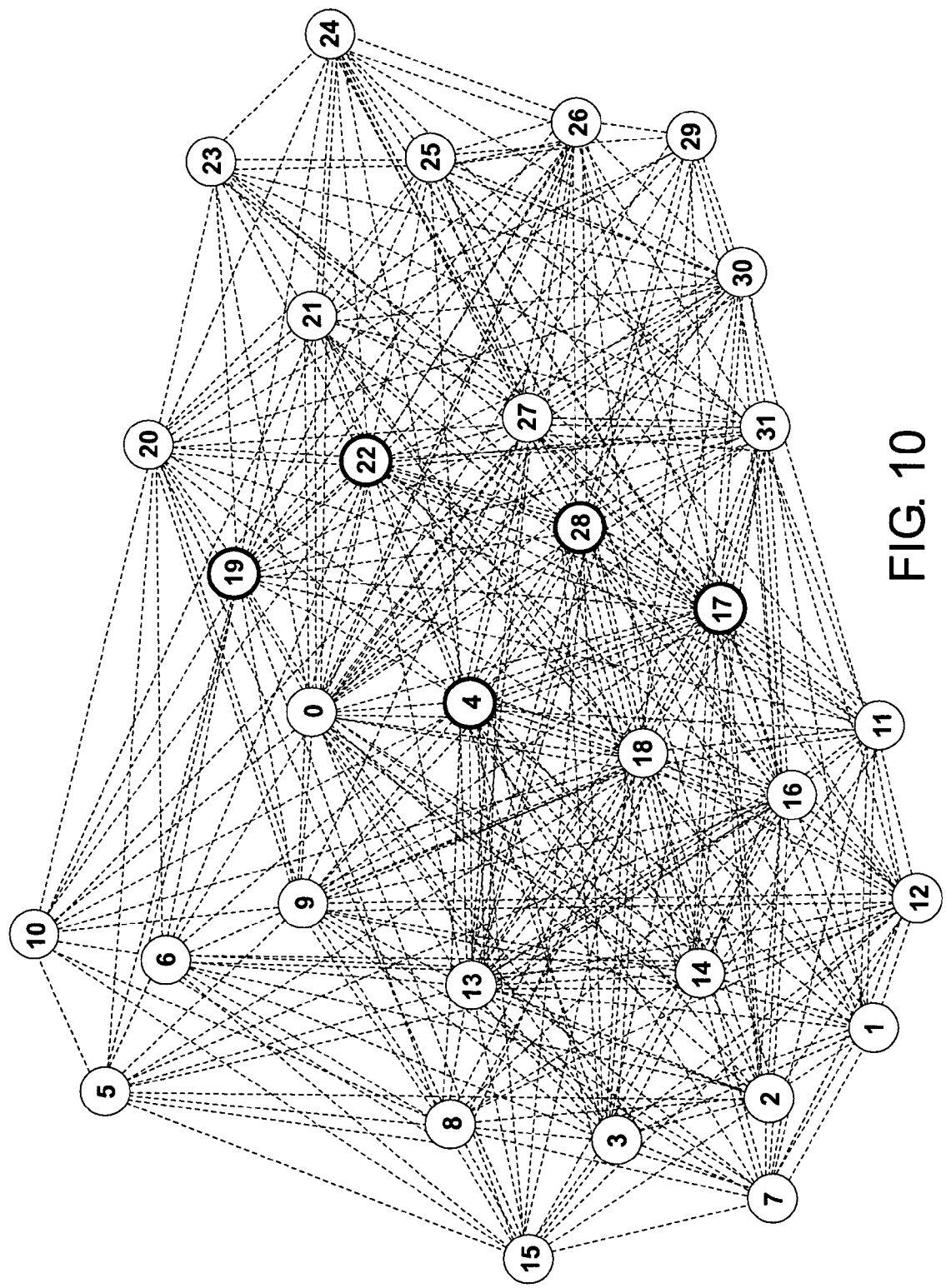
FIG. 10 is a schematic diagram of a very dense communications network using artery nodes.

The number of artery nodes in a network depends upon the amount of connectivity between the nodes in the network. FIGS. 7-10 illustrate this point, in which artery nodes are identified with darker circles and non-artery nodes identified with lighter circles. In FIGS. 7 and 8 links having a high degree of stability are shown as solid lines, while links having a lesser degree of stability are shown as dashed lines. In FIGS. 9 and 10 all links are shown as dashed lines for the sake of clarity, it being understood that a majority of the links depicted in FIGS. 9 and 10 exhibit a high degree of stability. In these Figures, only communication links having a high degree of stability are considered for linking artery nodes. In FIG. 7, most nodes in the network are required to be artery nodes because of the relatively few high-stability communication links within the network. Where the connectivity is slightly richer, as shown in FIG. 8, some nodes can abandon their roles as artery nodes. On the other hand, node 31 becomes an artery node to connect nodes that would otherwise need to communicate over a much longer route. In FIG. 9 there are more high-stability links between nodes than in previous Figures, and the artery nodes are concentrated in the core, or the center, of the network where they can be most beneficial arbitrating the channel resources for the nodes around the edges of the network. In FIG. 10 the connectivity of the network is very dense so that just a few artery nodes in the center of the network can service the entire network. Finally, if each node in the network is fully connected to all other nodes in the network, there may be only one artery node.

Once the arterial sub-network has been established, or alternately when a node has been determined to be an artery node, each artery node may assign itself a pool of RBS slots and yield or loan the slots out to neighboring nodes as previously described. Indeed, the concept of yielding and loaning RBS slots works particularly well with the artery node concept because the artery nodes are given priority in the assigning of RBS slots.

In a large communications network, there may be many nodes simultaneously connecting and disconnecting thereto, and it may be necessary to continually determine whether or not a particular node should assign itself as an artery node. To ensure convergence to an arterial sub-network solution, a randomization delay is enforced before a node performs the previously described algorithm. For example, before changing state from a non-artery node to an artery node or vice-versa, a random delay of 1 to (N+1) CNiB cycles is waited, where N is the number of 1- or 2-hop neighbors that reported a change in state in a previous reporting period. As the likelihood decreases that two simultaneously connecting nodes will be assigned the same randomization delay, the likelihood of simultaneously executing the algorithm for the nodes is lessened.

The algorithm for determining whether a node is an artery node requires that nodes share a small amount of information. The monitor packet for a given node contains a bit for the node and a bit for each of the node's neighbors to indicate whether any of the neighbors is an artery node. In the channel neighborhood example described above, the monitor packet may be the CNiB packet or it may be transmitted separately in an RBS.

As with any communications network, the convergence and stability of the artery node algorithm depends on the stability of the links between nodes. Therefore, the links between nodes should be evaluated to determine whether the links are highly stable, meaning that the links consistently can be used for reliable communications with a high degree of confidence. A potential artery node should be connected to the artery node sub-network using only high-stability links. Conversely, if the node cannot be connected to the artery node sub-network using high-stability links, the node should not be considered as an artery node. While such a condition may require creating more artery nodes than is absolutely necessary, the artery nodes so identified will converge quickly after changes in topology and will assign time slots more reliably and efficiently.

Figure 11:
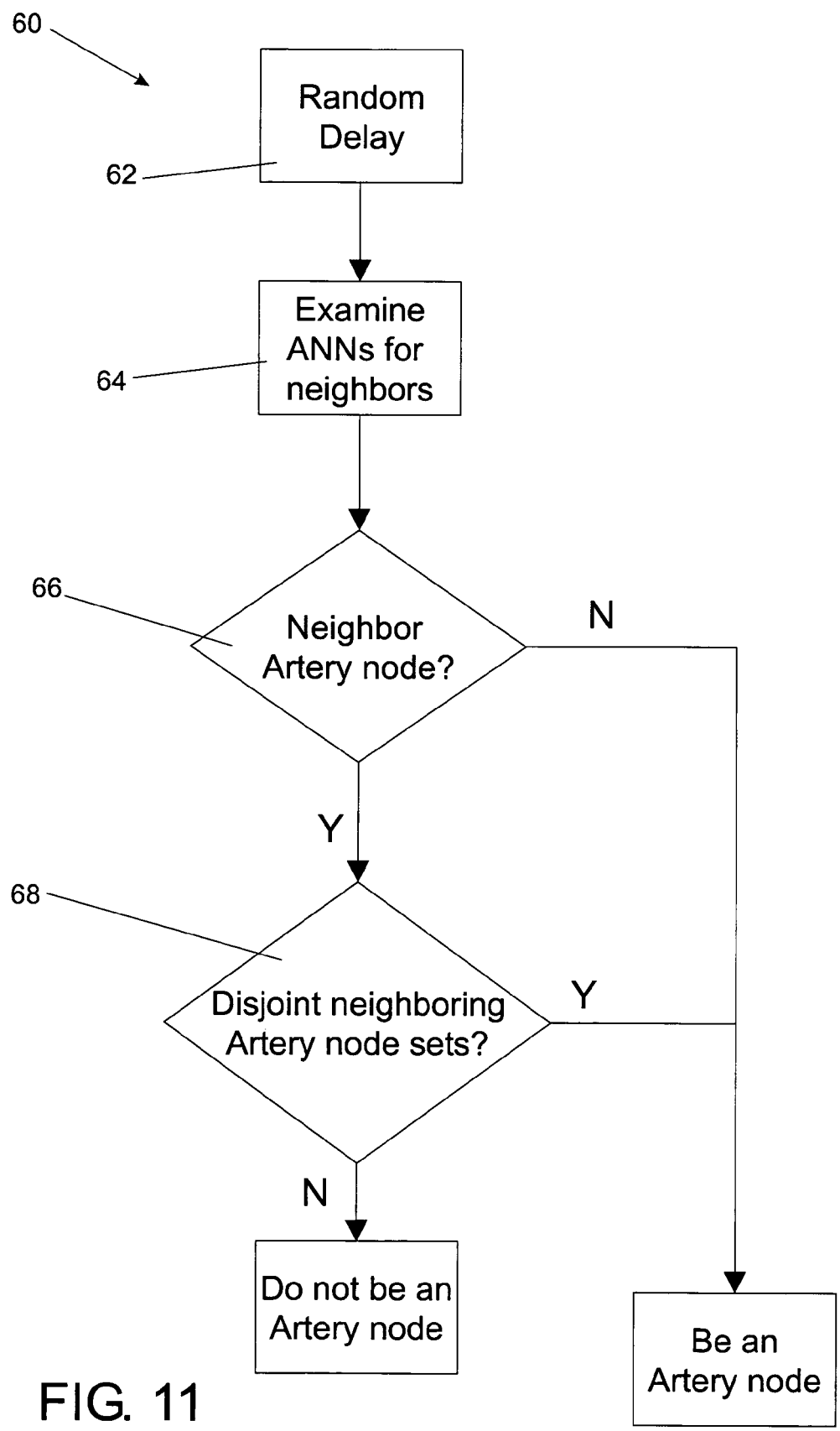
FIG. 11 is a block diagram of a method according to the invention.

A method to determine whether a node should be an artery node is shown at reference number 60 in FIG. 11. In step 62 a random delay is waited before the node performs the remainder of the algorithm. As previously described, the random delay ensures convergence to an artery node solution. In step 64 the node defines a set of Artery Node Neighbors (ANN) as the set of neighbors to the node that have announced themselves as artery nodes, plus the node itself if the node is currently operating as an artery node. This is made possible by each node announcing its artery node status and its ANN periodically in its monitor packets. Using this information, in steps 66 to 68 the node will examine the artery node status of its neighbors along with their ANNs to decide if it should become an artery node. In step 66 the node determines whether there is an artery node within one hop of the node, and if not, the node should be an artery node. If there is an artery node within one hop, then the algorithm continues to step 68, in which the node determines whether the list of ANNs of any two neighbors of the node are disjoint or otherwise unconnected, and if so, the node should be an artery node. If the condition of step 68 is not satisfied, the node should not be an artery node.

Figure 12:
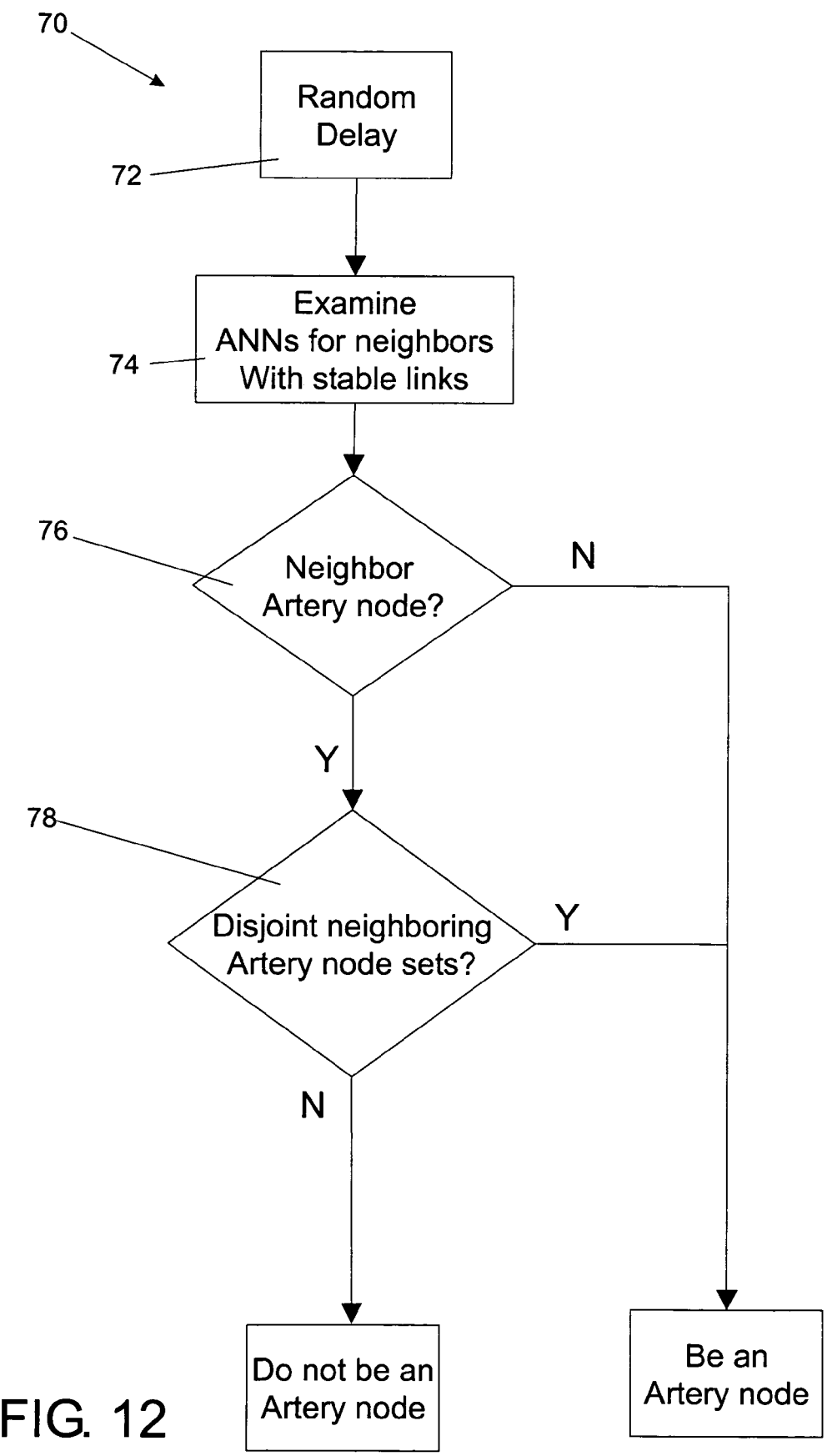
FIG. 12 is a block diagram of another method according to the invention.

FIG. 12 depicts a method 70 according to another embodiment in which the reliability and stability of the communications links between nodes are considered in determining whether a node should be an artery node. Although it can be seen that method 70 is similar to method 60, in step 74 of method 70 the communication links between the node and other artery nodes are evaluated, and the node is permitted to assign itself to be an artery node only if those links are sufficiently highly stable. Only ANNs from nodes with stable links are used in the decisions at steps 76 and 78, which are similar to steps 66 and 68 in method 60.

As shown in the Figures, the result of the invented algorithms is the establishment of a continuous network of artery nodes with increased capacity and reduced latency due to their contentionless access to the channel. Because every node is, at most, one hop from this arterial network, contention along a route to any destination is limited to the first hop and is contention-free if the source node is an artery node.

The concept of artery nodes has been described in the context of a multi-channel communication network that takes advantage of USAP protocols. However, arterial sub-networks may have application in single-channel networks, networks using non-USAP protocols, and any other type of communications network where broadcast time slots are at a premium.

An advantage of the invention is that broadcast slots can be efficiently apportioned and scheduled among nodes in a network. In the embodiment described in detail above, RBSs are reserved for the artery nodes, and non-artery nodes may access the RBSs through yielding or loaning techniques.

Another advantage is that because artery nodes have contention-less access to the broadcast time slots, a stable, efficient, and predictable sub-network is created within a communications network.

Another advantage is that because all nodes in the network are within one hop of an artery node, contention access is limited to non-artery nodes on the first hop to accessing the arterial network, and then only until an RBS can be loaned to the non-artery node by an artery node.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of communicating over a network of nodes, comprising:

determining whether a first node forms part of an interconnected sub-network within the network; and assigning broadcast slots to the first node if the first node is part of the sub-network;

permitting the first node to use the assigned broadcast slots to broadcast data to other nodes; and permitting nodes within one hop of the first node but not forming part of the sub-network to use an assigned broadcast slot if the first node is not using the broadcast slot.

2. The method of claim 1, wherein the determining step further comprises:

assigning the first node to be part of the sub-network if no node within one hop of the first node is part of the sub-network.

3. The method of claim 2, wherein the determining step further comprises:

assigning the first node to be part of the sub-network if a set of nodes in the sub-network known to a first neighbor of the first node is disjoint from a set of nodes in the sub-network known to a second neighbor of the first node.

4. The method of claim 1, wherein the first node permits nodes adjacent to the first node and not part of the sub-network to contend for use of one of the assigned broadcast slots if the first node is not using the broadcast slot.

5. The method of claim 1, wherein the first node permits an adjacent node that is not part of the sub-network to use one of the assigned broadcast slots if the first node is not using the broadcast slot.

6. The method of claim 1, wherein a random time delay is executed prior to determining whether the first node is part of the Interconnected sub-network.

7. The method of claim 1, wherein the network communicates using a unifying slot assignment protocol.

8. The method of claim 1 further comprising:

ascertaining, prior to the determining step, a level of communication reliability and stability of a link between a node in the sub-network and a neighboring node not in the sub-network; and permitting the neighboring node to be considered in said determining step only if the level of communication reliability and stability of the link to the neighboring node is above a predetermined level.

9. A method of assigning communication time slots to nodes in a wireless network, comprising:

determining, for each node in the network, whether the node is part of an interconnected sub-network formed within the wireless network, wherein no node in the network is more than one hop away from a node in the sub-network;

assigning time slots to nodes in the sub-network; and permitting nodes within the sub-network to use the assigned time slots to broadcast data to other nodes in the wireless network;

allowing a node that is not part of the sub-network to use an assigned time slot to broadcast data to other nodes in the network if the nodes that are part of the sub-network are not using the assigned time slot.

10. The method of claim 9, wherein a node that is part of the sub-network permits adjacent nodes that are not part of the sub-network to contend for use of one of the assigned broadcast slots if said node that is part of the sub-network is not using the broadcast slot.

11. The method of claim 9, wherein a node that is part of the sub-network permits an adjacent node that is not part of the sub-network to use one of the assigned broadcast slots if said node that is part of the sub-network is not using the broadcast slot.

12. The method of claim 9, wherein the determining step further includes assigning the first node to be part of the sub-network when no node within one hop of the first node is part of the sub-network.

13. The method of claim 9, wherein the determining step further includes assigning the first node to be part of the sub-network when a set of nodes in the sub-network known to a first neighbor of the first node is disjoint from a set of nodes in the sub-network known to a second neighbor of the first node.

14. The method of claim 9, further comprising:
broadcasting, from each node, a data packet to adjacent nodes, wherein the data packet identifies
whether a broadcasting node is part of the sub-network, and
whether adjacent nodes to the broadcasting node are part of the sub-network.

15. The method of claim 9, wherein the wireless network communicates using a unifying slot assignment protocol.

16. The method of claim 9, wherein a random time delay is executed prior to determining whether each node is part of the interconnected sub-network.

17. The method of claim 9, further comprising:
ascertaining, prior to the determining step, a level of communication reliability and stability of a link between a node in the sub-network and a neighboring node not in the sub-network; and
permitting the neighboring node to be considered in said determining step only if the level of communication reliability and stability of the link to the neighboring node is above a predetermined level.

* * * * *